Nov. 24, 1970    J. G. COHEN    3,541,702
EDUCATIONAL DEVICE
Filed Nov. 25, 1968

INVENTOR
JULIUS G. COHEN
BY Ralph W. Kalish
ATTORNEY

United States Patent Office 3,541,702
Patented Nov. 24, 1970

3,541,702
EDUCATIONAL DEVICE
Julius G. Cohen, 1903 W. Main St.,
Jefferson City, Mo. 65101
Filed Nov. 25, 1968, Ser. No. 778,644
Int. Cl. G09b 1/30
U.S. Cl. 35—9          4 Claims

ABSTRACT OF THE DISCLOSURE

An educational device comprising a booklet having front and rear covers and intervening transparent pages; indicia being provided on like sides of successive pages in series for illustrating the step by step solution of a problem or development of a particular system by superimposition of said pages. The inner face of the cover remote from the first page of such series and the indicia are of like color so that the indicia are invisible prior to turning of the related page into operative or problem resolving position.

BACKGROUND AND SUMMARY OF THE INVENTION

Heretofore various efforts have been made to develop teaching devices utilizing transparent pages for mutual overlying relationship so as to progressively reveal the particular stages in the solution of a problem and the like. Examples of this type are exemplified by United States Letters Patent Nos. 2,149,779 and 2,751,690. However, such prior art constructions have not incorporated means for masking the intelligence on successive pages so that the user may in some instances be able to detect the succeeding steps by studying the mirror images thereof (see Pat. No. 2,751,690) or by causing the pages to be prematurely brought into contact as with the structure shown in United States Letters Patent No. 1,673,659.

Therefore, it is an object of the present invention to provide an educational device comprising, in booklet form, a plurality of transparent pages having opaque indicia or characters in related disposition for illustrating the resolution of a problem or the like and which incorporates novel means for preventing the inadvertent disclosure to the user of succeeding steps prior to the actual turning of the page into operative position.

It is another object of the present invention to provide an educational device of the character stated which incorporates indicia-blanking means so that the user will not be confused by the exposure of subsequent stages of the problem being resolved and the user will not be tempted seek premature information concerning later stages of the problem solution and thus be caused to direct his efforts to a proper study of the exposed portion of the problem.

It is another object of the present invention to provide an educational device of the character stated which may be readily adapted to existing systems and which is equally useful with booklets wherein the problem to be worked may be presented on a forward page for development by turning pages rearwardly thereof or by the converse.

It is a further object of the present invention to provide an educational device of the character stated which may be most inexpensively produced; which is markedly effective for teaching purposes; and which is extremely versatile, being adapted for utilization with myriad types of intellectual matter.

DESCRIPTION OF THE PREFERRED EMBODIMENT

Figure 1:
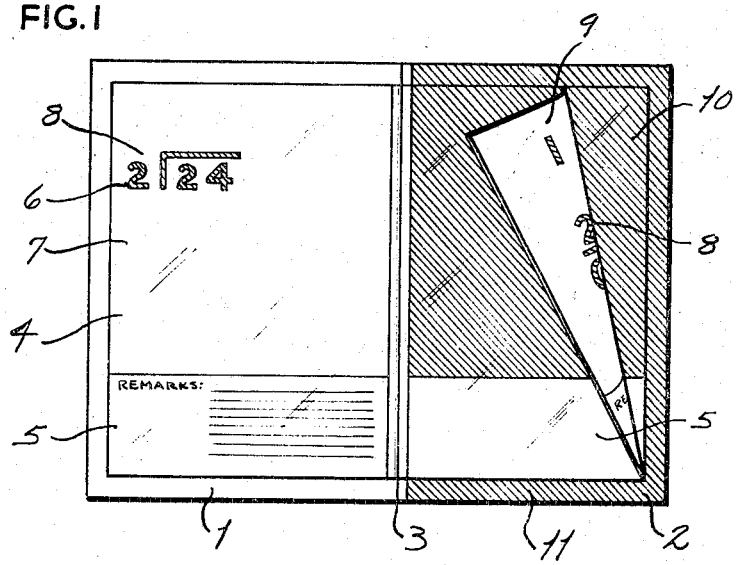
FIG. 1 is a top plan view of an educational device constructed in accordance with and embodying the present invention, illustrating the booklet in open condition and with the problem being presented on the forwardmost sheet of the particular series.

Referring now by reference characters to the drawings which illustrate the preferred embodiment of the present invention, A generally designates an educational device of booklet form having front and rear covers 1, 2, respectively, which are suitably hinged along their proximate margins, as indicated at 3; said booklet being of the looseleaf binder type or permanently bound, as desired. Mounted between covers 1, 2 is a plurality of pages, indicated generally 4, being fabricated of flexible transparent material. Each such page may be treated so as to provide lower opaque zones or portions, as at 5. As will be shown hereinbelow, successive pages are integrated in series relationship for stepwise illustrating the solution of a problem presented on the first page of such series. It is recognized that the problem-presenting page may be the forwardmost or rearwardmost in the particular series so that the companion pages will be turned forwardly or rearwardly, as the case may be, for presentation of the problem solution. For purposes of illustration only, the present invention is shown in the figures with the particular problem, as being indicated at 6, disposed on the first page of the particular series so that the successive, companion pages must be turned forwardly.

Figure 2:
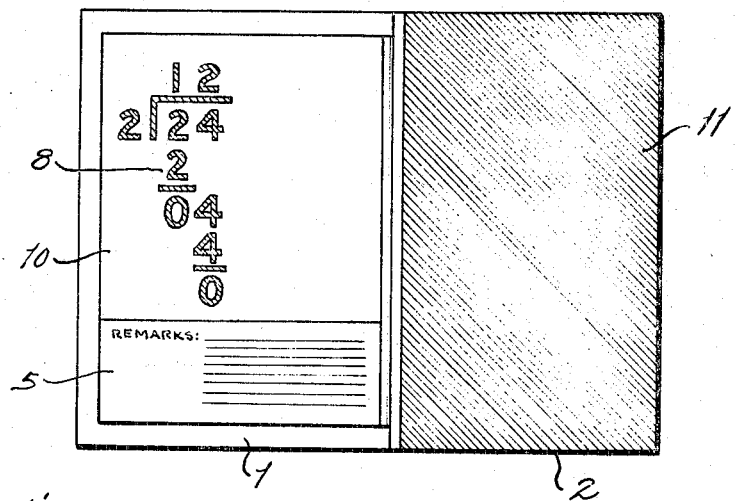
FIG. 2 is a top plan view of an educational device of FIG. 1 and showing the same with the pages presented in problem-solving condition.

Referring now to FIG. 1, it will be seen that 7 indicates the initial page in the series having the problem 6 disposed thereon, by means of indicia 8. Said latter are mounted on the normally rearward side of page 7 and in the transparent portion thereof. The problem 6 is one of long division and comprises merely the divisor and dividend. The opaque zone 5 may have imprinted or otherwise provided thereon instructional material. The next succeeding page, as indicated at 9, also mounts indicia 8 on its rearward face which are so located that when page 9 is turned forwardly for superimposition upon page 7 the first step in the resolution of the problem of division will be revealed. The following page, as indicated at 10, will then be turned forwardly into superimposition upon page 9 (FIG. 2) and will present indicia 8 located on its rearward face for disclosing the succeeding step in the determination of problem 6. Thus, by reason of the transparent nature of pages 7, 9 and 10, the respective indicia 8 will be simultaneously revealed so as to present to view the completed problem (see FIG. 2). As indicated above, each page may have its related opaque portion 5 carry such instructional or text material as preselected.

By the progressive exposure of the succeeding steps in the working out of problem 6, the user is thus accorded an opportunity to attempt to resolve the particular step prior to the unfolding of the solution by the turning of the pages.

The inner face of cover 2, as at 11, is colored at least throughout its extent for responding to the transparent portions of pages 4 so as to provide a background visible therethrough. Although the particular color selected may be a matter of choice, green, as indicated in the drawings, has been found especially suitable due to its acknowledged restfulness to the eyes. The indicia 8 on each page, which may be decals, are of the same color and shade as the inside of cover 2 so that when the latter are superimposed upon said cover, as evidenced by page 10 in FIG. 1, the related indicia are invisible by reason of such blending. This unique characteristic of educational device A assures that the user may not inadvertently prematurely gain information concerning succeeding steps in the solution of the particular problem until the respective page has been turned forwardly and brought into superimposition upon the initial page 7 of the series. Thus, the color relationship between rear cover 2 and indicia 8 provides an effective and reliable blocking out of such indicia and assures that the user will not, consciously or otherwise, gain knowledge of ultimate stages in the particular procedure until same are revealed at the appropriate juncture.

It is, of course, understood that if the first page in the series were to be presented rearwardmost thereof, with the succeeding pages being turned rearwardly, then the masking color would be located upon the inside face of front cover 1.

Figure 3:
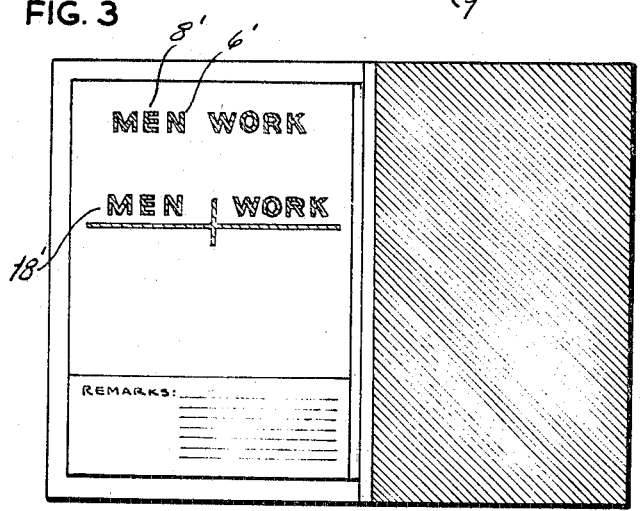
FIG. 3 is a top plan view of the educational device showing the same in open condition and with the pages so arranged as to prevent an intermediate stage in the development of a grammatical exercise.

Although educational device A has been described hereinabove in conjunction with a mathematical problem, the versatility of this invention must be observed since the same can be as easily used for grammatical exercises, stage by stage disclosure of chemical reactions, illustrative development of structural formulations of chemical compounds, etc. Exemplary of such a wide spectrum of usages are the pages 4' shown in the booklet of FIG. 3. Therein the initial page of the series discloses, as by indicia 8', a short sentence 6' for diagraming. The next succeeding page carries its indicia, as at 18', for demonstrating the first step in a sentence diagraming method. The indicia 8' and 18' are of like color as the inner face of rear cover 2 so that the same will not be revealed until the related page has been turned forwardly into superimposed condition upon the problem-carrying page.

Accordingly, the educational device above described is most reliable in usage, making certain by its noval construction that a user may not unwittingly anticipate a future stage of the problem at hand but be caused to study each step only as the same is intentially presented for attentive consideration. It is apparent that by the use of the present invention material to be sequentially exposed will not be observable until the appropriate stage has been reached so that the user will be spared the possibility of confusion by seeing material other than that for immediate consideration.

Having thus described my invention, what I claim and desire to obtain by Letters Patent is:

1. An educational device comprising a booklet having front and rear covers, means hingedly interconnecting said front and rear covers for swinging of same between open and closed condition, a plurality of pages having transparent portions mounted between said front and rear covers, opaque characters carried on the corresponding side of each page and being related to the characters on such other pages so that when said pages are in superimposed condition with the booklet open said characters will illustrate a completed problem resolution, the inside face of the cover remote from the lowermost page when said pages are in exposed superimposed condition being colored, said characters being of the same color as the color of said inside face of the aforesaid cover so that characters on said pages prior to presentation of the latter in said superimposed condition will be blocked from view.

2. As educational device as defined in claim 1 and further characterized by said pages being serially arranged, the characters on the first page in such series disclosing a problem for resolution, the characters on each succeeding page presenting a progressive step in the resolution of the said presented problem.

3. An educational device as defined in claim 2 and further characterized by the first page of said series being located forwardmost in said booklet, the characters on each page being presented on the normally rearward side thereof, and the inside face of the rear cover being colored.

4. An educational device as defined in claim 2 and further characterized by the first page of said series being disposed rearwardmost thereof in said booklet, the characters on each page of said series being disposed on the forward faces thereof, and the inside face of the front cover being colored.

References Cited

UNITED STATES PATENTS

| 636,319 | 11/1899 | Camp | 35—28 |
|---|---|---|---|
| 1,673,659 | 6/1928 | Anderson | 35—9 |
| 1,816,353 | 7/1931 | Anderson | 40—135 |
| 2,149,779 | 3/1939 | Kroner | 40—135 |
| 2,751,690 | 6/1956 | Cohen | 35—31 |

WILLIAM H. GRIEB, Primary Examiner

U.S. Cl. X.R.

35—31